Patented July 18, 1950

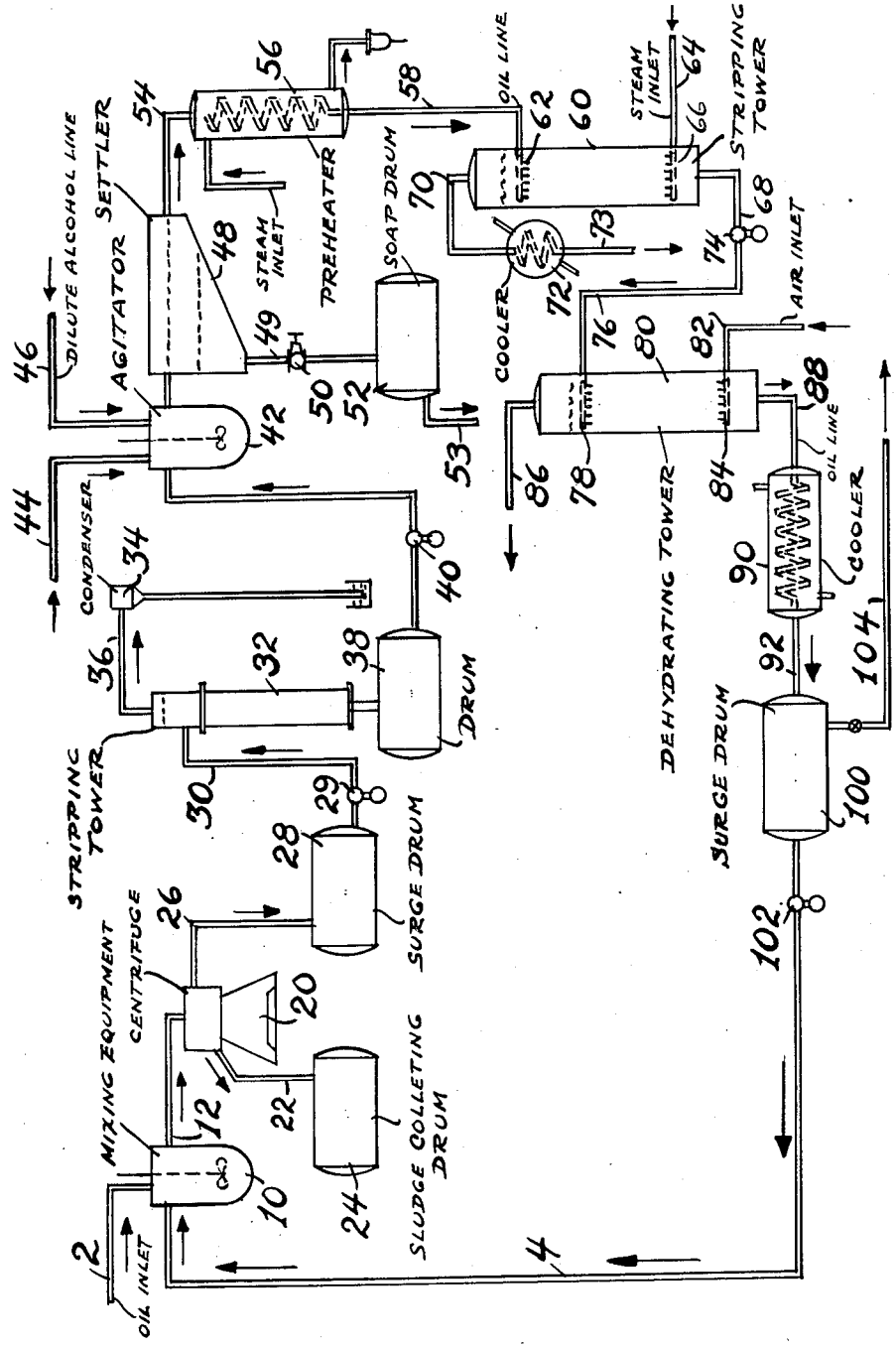

2,515,197

UNITED STATES PATENT OFFICE 2,515,197

EXTENSIVELY TREATING PETROLEUM DISTILLATES

Charles A. Cohen, Roselle Park, N. J., assignor to Standard Oil Development Company, a corporation of Delaware Application January 4, 1947, Serial No. 720,293

3 Claims. (Cl. 196—40)

This invention relates to an improved process for the preparation of stable highly refined mineral oils and of oil-soluble petroleum sulfonates and in particular, to an improved process for the purification of the oil soluble sulfonates obtained as by-products in the preparation of mineral white oils.

In the preparation of white oil products, a petroleum base stock usually of Mid-Continent or Gulf Coast origin is exhaustively treated with sulfuric acid, that is, a distillate usually of lubricating oil range is treated with acid of between 96% strength and 30% fuming acid and with a volume relative to the oil of between about 15 and about 50%. The acid is usually applied to the oil in several small quantities and the heavy sludge phase separated before the subsequent addition of acid. After the separation of the heavy sludge resulting from the final treatment with the acid, the oil is highly colored due to the presence of finely dispersed sludge throughout the oil. High speed centrifuges are commonly employed to separate this finely divided sludge, commonly known as "pepper" sludge, from the oil prior to neutralization. By such treatment, however, small quantities of sludge still remain dispersed in the oil. This sludge dispersion is the cause of many difficulties, such as emulsification, in subsequent processing. The present invention is an improvement over such processing especially in regard to the removal of the finely divided sludge.

The oil after sludge separation is normally neutralized with an alkali generally in the case of mineral white oil stocks, with an aqueous solution of sodium carbonate. The neutralized oil is then treated with an aqueous alcoholic solution containing between about 20% and 50% alcohol, usually of either ethyl or isopropyl alcohol. The oil after neutralization is usually steamed to remove alcohol and water. The aqueous alcoholic solutions, especially those of higher alcohol content, remove from the oil substantial quantities of oil-soluble sulfonates. The color of the solution depends largely upon the degree of separation of the sludge from the oil prior to neutralization. The present invention is concerned particularly with the removal of sludge from the oil prior to aqueous alcoholic washing as a particular means of improving the color of the oil and of the sulfonates obtained from the aqueous alcoholic solutions.

When high speed centrifuges are employed for the separation of sludge, the oil which overflows from the centrifuge generally contains, when the sulfonate content of the oil is about 10 grams per 100 cc., from 1 to 2% of finely divided suspended sludge. It has now been found that this small quantity of finely divided and finely dispersed sludge may be separated from the oil prior to neutralization by recycling into the feed to the centrifuges or other such equipment for separating "pepper" sludge, 20% to 80% and preferably about an equal volume of what is commonly termed an intermediate neutral oil. By the term, intermediate neutral oil, is meant an acid treated oil from which the sludge has been separated by such commonly available means as the centrifuge and then which has been subsequently neutralized, then treated with an aqueous alcoholic solution and finally steamed. A further improvement in sludge removal may be obtained by adding to the oil prior to this fine sludge separation, a small quantity of filter aid.

The effectiveness of the recycling procedure appears to be connected with a sulfonate dilution effect. While the amount of "pepper" sludge retained in the oil is roughly proportional to the amount of sulfonic acid dissolved in the oil, a direct proportion cannot be drawn. For example, an acid oil having a sulfonic acid concentration of from approximately 10–12 grams of sulfonic acid per 100 cc. generally contains from 1 to 2% of suspended sludge after centrifuging an acid oil after heavy sludge separation. On the other hand, if the acid oil prior to centrifuging is diluted with an oil of about the same boiling range in which about 5 or 6 grams of sulfonic acid per 100 cc. concentration occurs, it has been found that on centrifuging, the oil mixture contains less than 0.1% by volume of sludge. Based on the original sulfonic acid content, the sludge has therefore been reduced from about 10 to 20% by volume of sludge on the sulfonic acid to about 1 to 2% by volume of sludge. With proper dilution and conditions of operation a sludge content based on the sulfonic acid content of less than 1% may be obtained.

As a specific illustration of this invention a flow diagram is presented in the drawing. A heavily acid treated oil containing about 2% suspended sludge and 10 grams of sulfonic acid per 100 cc. of oil enters through line 2, mixing equipment 10, in this particular case an agitator. Into this agitator is also passed through line 4 a quantity of neutralized and washed oil. The mixture of acid oil, sludge and neutral oil overflows the agitator 10 through line 12 into centrifuge 20 whereby the sludge is separated through line 22 to a sludge collecting drum 24. The clear sludge-free oil is discharged from the centrifuge through line 26 to a surge drum 28. The oil is then passed through pump 29 and supplied to an SO₂ stripping tower 32 through line 30. Vacuum is applied to the tower through a barometric jet and condenser 34 to remove SO₂ from the oil through line 36. The SO₂-free oil is collected in drum 38, passed through pump 40 and supplied to an agitator 42. Also passed into the agitator 42 is sodium carbonate solution through line 44 and a quantity of dilute alcohol through line 46.

The neutralized mixture of oil and sulfonate solution overflows into settler 48 from which the soap solution is withdrawn at a constant rate through line 49 by means of control valve 50 into a soap drum 52. The sulfonate solution is removed from soap drum 52 by means of line 53 for further processing and purification as desired. The neutralized and substantially sulfonate free oil overflows through line 54 into steam heated preheater 56 whereby it is brought to proper temperature for steam stripping to remove the alcohol present in a small amount in the oil leaving the preheater through line 58. The oil then passes to the stripping tower 60 through spray head 62. Steam is fed in sufficient quantity and pressure through line 64 and spray head 66 to maintain a temperature of about 120° C. in the oil leaving the stripping tower through line 68.

Alcohol and water are recovered overhead from the stripping tower through line 70, are condensed in cooler 72, and sent to storage through line 73. The oil leaving the stripping tower 60 through line 68 is fed by pump 74 to a dehydrating tower 80 through line 76 and spray head 78. Air, which may be preheated, is fed to the bottom of the tower through line 82 and distributor 84 and a small amount of moisture present in the oil is removed by this means and vented to the atmosphere through line 86. The oil leaves the dehydrating tower through line 88 through cooler 90 where it is reduced to the proper temperature and thence to surge drum 100 through line 92. Treated oil is recirculated from surge drum 100 through pump 102 to the agitator 10 for purposes of diluting the sludge containing oil. From surge drum 100 treated oil is also continuously withdrawn through line 104 to storage.

The efficacy of the recycling procedure of this invention can be gauged by comparison of the colors of sodium sulfonates extracted from the oil by the processings of the prior art and the method of the present invention. By processings not involving the recycling of the intermediate neutral oil a color of 5.5 red on the Lovibond Tintometer was obtained in a 7% (wt.) sulfonate dilution in a water-white mineral oil. On the other hand, the sodium sulfonate extracted from the same oil which had been previously diluted with 50% by volume with an intermediate neutral oil and then subjected to the same degree of centrifuging showed a color of 1.8 red for the same concentration and the same cell depth (1"). Also, the oil not diluted prior to centrifuging had a "pepper" sludge content of 1.5% by volume while that subjected to dilution had 0.1% by volume. This substantial reduction in "pepper" sludge content is, moreover, not to be expected on a purely dilution basis.

What is claimed is:

1. Improved process for the preparation of a white oil product from a distillate oil boiling in the lubricating oil boiling range which has been treated heavily with acid and which contains suspended sludge particles and soluble petroleum sulfonates which comprises adding to said distillate oil from about 20% to about 80% of a recycled refined oil product as defined hereinafter, centrifuging the mixture to separate sludge, washing the resulting distillate with a neutralizing agent, treating the resulting neutralized distillate with an aqueous alcohol solution to remove oil soluble sulfonate, steaming the treated distillate to produce said refined oil product, segregating said refined oil product into two portions, recycling one portion to said distillate oil and producing a white oil product from the other portion.

2. Process as defined by claim 1 wherein about equal volumes of said recycled refined oil product are added to said distillate oil.

3. Process as defined by claim 1 wherein said distillate oil contains about 2% of a finely divided sludge.

CHARLES A. COHEN.

REFERENCES CITED

The following references are of record in the file of this patent:

UNITED STATES PATENTS

| Number | Name | Date |
| --- | --- | --- |
| 1,387,835 | Cobb | Nov. 26, 1918 |
| 1,621,475 | Cross | Mar. 15, 1927 |
| 2,111,548 | Berry | Mar. 22, 1938 |
| 2,121,167 | Franklin | June 21, 1938 |

OTHER REFERENCES

Gruse et al.: Chemical Technology of Petroleum, 2nd ed., 1943, pages 547–8.